United States Patent [19]

Takayasu

[11] Patent Number: 4,893,744
[45] Date of Patent: Jan. 16, 1990

[54] LINING METHOD USING CLAD PIECES AND A CLAD PIECE FOR THE METHOD

[76] Inventor: Akira Takayasu, 5-1, Horita-Dori, Mizuho-Ku, Nagoya City, Aichi Pref., Japan

[21] Appl. No.: 621,121

[22] Filed: Jun. 13, 1984

Related U.S. Application Data

[63] Continuation of Ser. No. 451,829, Dec. 21, 1982, abandoned.

[30] Foreign Application Priority Data

Dec. 25, 1981 [JP] Japan .................... 56-215612

[51] Int. Cl.⁴ .................................... F16B 5/08
[52] U.S. Cl. ................................ 228/184; 228/189
[58] Field of Search ............. 428/584, 594, 595, 636, 428/660, 661, 662, 675, 681; 228/184, 189; 219/50, 86.1, 137 R, 101, 102, 106, 107

[56] References Cited

U.S. PATENT DOCUMENTS

| | | | |
|---|---|---|---|
| 2,148,427 | 2/1939 | Howard et al. | 228/184 |
| 2,209,290 | 7/1940 | Watts | 220/63 |
| 3,148,953 | 9/1964 | Goto | 228/184 |
| 3,464,802 | 9/1969 | Meyer | 428/594 |
| 3,596,793 | 8/1971 | Kocher | 229/63 R |
| 3,628,924 | 12/1971 | Nishio et al. | 428/661 |
| 4,073,427 | 2/1978 | Keifert et al. | 220/63 R |
| 4,117,201 | 9/1978 | Keifert | 428/591 |

FOREIGN PATENT DOCUMENTS

| | | | |
|---|---|---|---|
| 2913609 | 10/1980 | Fed. Rep. of Germany | 228/184 |
| 2395903 | 1/1979 | France | 228/184 |
| 52-37527 | 3/1977 | Japan | 228/184 |
| 54-13414 | 5/1979 | Japan | 428/661 |

OTHER PUBLICATIONS

Lyman, T. et al.; *Metals Handbook*, vol. 6, 8th edition, p. 484, TA472 A3 (1971).

*Primary Examiner*—John J. Zimmerman
*Attorney, Agent, or Firm*—Arnold, White & Durkee

[57] ABSTRACT

A clad piece comprising a surface layer and a liner. the surface layer consisting of a highly corrosion-resistant metal thin sheet and superposed on the liner, and the surface layer and the liner having been united into a laminated unitary body, can be easily produced by spot welding or seam welding, and can be advantageously used for the lining of tank wall and other chemical apparatuses.

3 Claims, 2 Drawing Sheets

FIG_1a
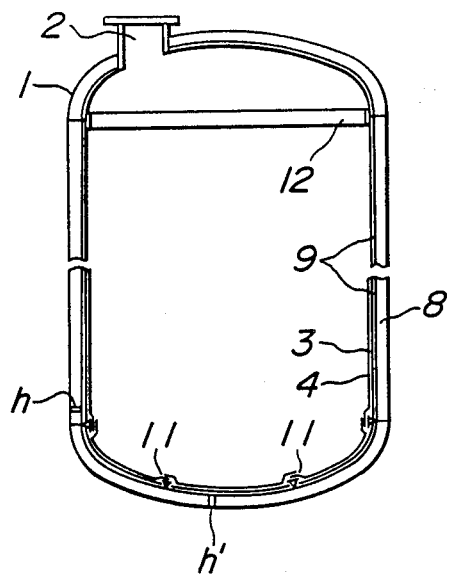
FIG_1b
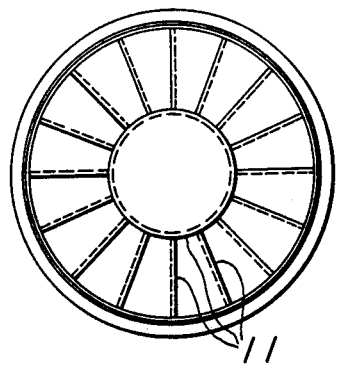
FIG_2
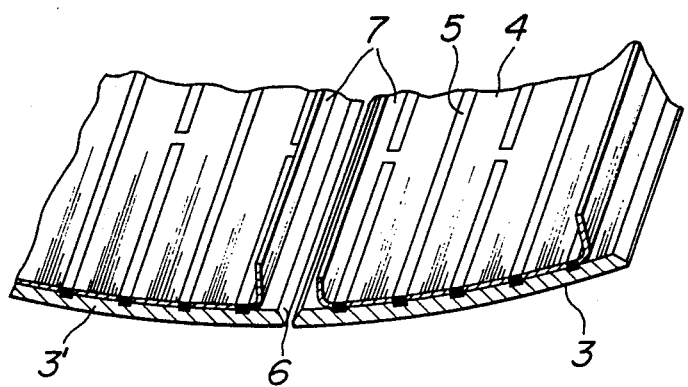

LINING METHOD USING CLAD PIECES AND A CLAD PIECE FOR THE METHOD

This is a continuation of application Ser. No. 451,829, filed 12/21/82, now abandoned.

BACKGROUND OF THE INVENTION (1) Field of the Invention

The present invention relates to a lining method using clad pieces and a clad piece adapted to be used for the method.

(2) Description of the Prior Art

Tanks for holding chemicals are often lined with highly corrosion-resistant metal. These liners are often a complicated process, for example the copper surface of a tantalum-copper clad is produced by an explosive adhesion process wherein the clad is adhered to the steel of a tank wall by the pressure of an explosion.

It is generally necessary in the explosive adhesion process that the metal sheet forming the surface layer of a clad has a thickness of at least 2 mm and the liner of the clad has a thickness of at least about 9–12 mm. However, when a surface layer of a clad is formed of an expensive and high-performance material, such as tantalum, about 0.1 mm thickness is used; and when a liner of a clad is formed of copper, about 1 mm thickness is used. Therefore, rolling and other steps requiring working of the metal are necessary in order to obtain the desired sheet thicknesses in the resulting clad. Moreover, in the welding of the clads produced by explosive adhesion, it is necessary that the tantalum surface layer located along the edge of the liner be scraped prior to the welding of the fellow clads. After welding the clads, the welded portion is covered with a thin tantalum strap and then is welded to the tantalum surface layer. However, tantalum has a melting point (2,996° C.) remarkably higher than the melting point of copper (1,083° C.), and therefore during the welding of the thin tantalum strap, the copper sheet is melted and alloyed with tantalum thereby deteriorating the performance of the tantalum surface layer. Therefore, welding of fellow conventional clads is very difficult and impractical.

SUMMARY OF THE INVENTION

The present invention provides a method of making a lining, carried out using clad pieces, which is free from the above described drawbacks, and further provides a clad piece which can be advantageously used for the lining of chemical apparatus.

One of the features of the present invention is to provide a method of lining chemical apparatus using clad pieces, comprising providing clad pieces, each comprising a surface layer with projected edge portions and a liner, said surface layer consisting of a thin sheet of highly corrosion-resistant metal superposed on the whole area of one surface of the liner, and said surface layer and said liner united through local bonding by means of an electric resistance welding such that the surface layer has free projected edge portions, which are projected from both the edges of the liner, in a width covering the bead width of butt welding to be carried out for the liner;

arranging the clad pieces on a base metal surface to be lined such that the edges of adjacent clad pieces to be welded are arranged in a face-to-face relation;

butt welding the adjacent clad pieces, then welding the butt welded clad pieces to the base metal;

arranging on the butt welded portion an insert strap covering the bead of this butt welding;

superposing one upon another the projected edge portions of both the surface layers on the insert strap; and subjecting the superposed projected edge portions and the insert strap to a welding.

Another feature of the present invention is to provide a clad piece for lining, comprising a surface layer and a liner; said surface layer consisting of a highly corrosion-resistant thin metal sheet superposed on the whole area of one surface of the liner; said surface layer and said liner having been united into a laminated body through local bonding by means of an electric resistance welding such that the surface layer has projected edge portions which are projected from both the edges of the liner and are free with respect to the liner.

BRIEF DESCRIPTION OF THE DRAWINGS

FIG. 1a is vertical sectional view of a tank lined with the clad pieces according to the present invention;

FIG. 1b is a view of the inner surface of the end plate of the tank illustrated in FIG. 1a;

FIG. 2 is a perspective view of the clad piece according to the present invention.

DESCRIPTION OF THE PREFERRED EMBODIMENT

Figure 3:
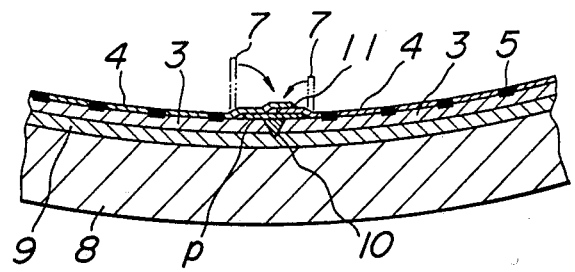
FIGS. 3 and 4 are sectional views of the welded portion illustrating how to carry out the welding in the present invention.

The clad piece to be used in the present invention is produced in the following manner. A thin sheet made of highly corrosion-resistant metal, such as titanium, tantalum, niobium, zirconium or the like, having a thickness, which enables the thin metal sheet to develop a predetermined performance under the use conditions of the thin metal sheet, for example, the pressure of a tank, sometimes the vacuum degree thereof and the like, is bonded to one surface of a liner, which is made of titanium or its alloy, copper or its alloy, or iron or its alloy, and has a thickness enough to reinforce the metal thin sheet, through local bonding by means of an electric resistance welding, such as spot welding, seam welding or the like, whereby the thin metal sheet and the liner is united to form the clad piece.

The surface layer formed of the thin metal sheet is superposed on the whole area of one surface of the liner. In this case, the surface layer is projected from both the edges of the liner to form free edge portions in a width at least covering the width of the butt welding bead to be carried out for the liner. As the result, when a projected edge portion is raised and the liners are arranged in a face-to-face relation, the butt welding of the fellow liners can be easily carried out together with the welding of the liners to the base metal. Further, after the welding, the weld bead is covered with an insert thin strap, the raised projected edge portions of both the surface layers are superposed one upon another on the thin insert strap, and the surface layers are welded along the projected edge portion. Whereby the base metal is effectively protected by the thin insert strap being influenced by the heat of welding.

The present invention will be explained in more detail with reference to the drawings.

FIG. 1a is a vertical sectional view of one embodiment of a tank having a lining according to the present invention, and FIG. 1b is a view of the inner surface of the end plate of the tank illustrated in FIG. 1a. The tank has an inner diameter of 2,600 mm and a total length of 12,000 mm, and has been assembled by welding clads consisting of a steel sheet having a thickness of 40 mm and a Ti sheet, which has a thickness of 2 mm and is adhered to the steel sheet by explosion, so as to form a tank wall having a Ti-lined inner surface. However, the corrosion resistance of the Ti lining is not satisfactory under high temperature conditions such as 260° C., and therefore requires a lining of Ta-Ti clad pieces in the tank up to a height of 3,000 mm produced in the following manner.

The corroded portion of the Ti lining was polished and smoothly finished by emery paper, and test holes h and h' were formed.

The Ta-Ti clad piece was produced by subjecting a tantalum foil having a thickness of 0.6 mm to a seam welding on the whole area of one surface a Ti liner having a thickness of 5 mm at a pitch of 25 mm to produce a laminated unitary body.

Clad pieces having the following dimensions and shape were produced so that the clad pieces could be easily carried into the tank 1 through manhole 2 as illustrated in FIG. 1a. That is, in the drum wall potion, 20 clad pieces were used, each curving cylindrically along the drum wall of the tank, each piece having having a width equal to one-twentieth of the circumference of the drum, a height equal to the height to be lined in the drum, and free edge portions projecting from both the edges of the liner, said edges being a little wider than the groove width of the butt welding of adjacent liners as illustrated in FIG. 2. In the end plate portion of the tank, 20 fan-shaped clad pieces, each having a width equal to one-twentieth of the circumference of the drum of the tank, and one disc-shaped clad piece having an outer diameter of 400 mm were used.

In FIG. 2, the numeral 3 represents a liner, 4: a surface layer, 5: a seam-welded portion, 6: a groove for butt welding of liners, and 7: a projected edge portion.

These clad pieces are successively carried into the tank 1 through the manhold 2 having an inner diameter of 500 mm, arranged on a base metal of an already formed lining 9 consisting of a Ti sheet adhered by explosion to the inner surface of a sheet 8, which forms the shell of the tank, and fellow liners 3' and 3' of adjacent clad pieces were subjected to a butt welding to unite them together and to unite them with the base metal 9 as illustrated in FIG. 3. Then, the weld beam 10 was covered with an insert strap P consisting of a Ta sheet having a thickness of 1 mm, and the projected edge portions 7 and 7, which had previously been raised as shown by broken lines in FIG. 3, were superposed one upon another on the insert strap P, after which a welding 11 of Ta of th edge of the projected edge portion arranged on the upper side was carried out on the projected edge portion arranged on the lower side as illustrated in FIG. 3. Although FIG. 3 shows how to weld the clad pieces to the inner circumference of drum wall of a tank, the welding of clad pieces to the end plate portion of the tank can be carried out in substantially the same manner as described above, and the welding 11 of Ta is illustrated by a solid line in FIG. 1b.

In FIG. 1a, the numeral 12 represents an annular strap consisting of a thin Ti sheet arranged on the Ti lining 9 between the inner circumference of the welded joint portion of the drum wall and the end plate of the tank 1.

After a repairing lining is carried out over the necessary portion, a color etching is carried out on the whole area, and then a bubbling test is carried out by using test holes h and h', and finally a hydraulic pressure test is carried out to assure a completely lined product is obtained.

Figure 4:
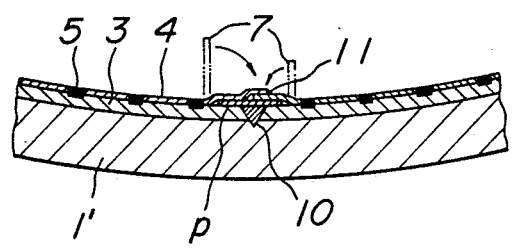

In the above described embodiment, a double lining formed from clad pieces is carried out at the portion of a tank which has previously been subjected to a Ti lining. It is apparent that the lining according to the present invention, can be formed as illustrated in FIG. 4 in the same manner as described above on the inner circumference of a tank 1' consisting of a steel sheet. In this case, the liner, is made of Ti or its alloy, Cu or its alloy, or iron or its alloy; and the surface layer is made of Ti, Ta, Nb, Zr and the like depending upon the amount of corrosion resistance demanded. The clad pieces of the liner can be, spot welded in addition to the above described seam welding.

According to the present invention, a thin sheet made of highly corrosion-resistant steel is locally welded to a liner to form a laminated unitary body, and then the body is used as a clad piece. Therefore, the clad piece can be produced without troublesome working of the metal, the lining for the tank can be advantageously carried out. Particularly, the weldings carried out in the liner and in the surface layer of the clad piece do not interfere with each other, and therefore the performance of the surface layer does not deteriorate. Moreover, when the clad piece according to the present invention is used, lining of a tank can be carried out very advantageously.

What is claimed is:

1. A method of lining chemical apparatus, comprising:
    (a) providing clad pieces consisting of a liner layer and a corrosion resistant metal surface layer, said surface layer being superposed on the entire area of said liner layer and said surface layer having raised projecting edges;
    (b) arranging at least two of said clad pieces side by side on the inner surface of a chemical apparatus whereby the liner layers of said clad pieces abut forming a seam;
    (c) welding together the abutting liner layers of said clad pieces and welding together said clad pieces and said apparatus thereby forming a weld bead;
    (d) covering the weld bead with an insert strap of corrosion resistant metal;
    (e) superposing the raised projecting edges of the surface layers adjacent the weld bead over said insert strap; and
    (f) welding together the superposed projecting edges of said surface layers and said insert strap.

2. The method according to claim 1 wherein said welding steps (c) and (f) are performed by electric resistance welding means.

3. The method according to claim 1, wherein said projecting edges of said surface layer are wider than said weld bead.

* * * * *